UNITED STATES PATENT OFFICE.

ROBERT E. SCHMIDT, OF ELBERFELD, GERMANY, ASSIGNOR TO THE FARBEN-FABRIKEN OF ELBERFELD COMPANY, OF NEW YORK.

ANTHRARUFIN DYE AND PROCESS OF MAKING SAME.

SPECIFICATION forming part of Letters Patent No. 623,220, dated April 18, 1899.

Application filed March 16, 1898. Serial No. 674,034. (Specimens.)

*To all whom it may concern:*

Be it known that I, ROBERT E. SCHMIDT, doctor of philosophy, chemist, residing at Elberfeld, Germany, (assignor to the FARBEN-FABRIKEN OF ELBERFELD COMPANY, of New York,) have invented a new and useful Improvement in Anthrarufin Dyes; and I hereby declare the following to be a clear and exact description of my invention.

In the specification of Letters Patent No. 595,349, dated December 14, 1897, granted to the Farbenfabriken, vormals Fr. Bayer & Co., of Elberfeld, Germany, I have described that by a complete reduction of the nitro groups contained in the dinitro anthrarufin disulfo acid with the aid of stannous chlorid and muriatic acid diamidoanthrarufin disulfo acid is obtained. I now have found that if only such quantities of the said reducing agent as correspond with eight atoms of hydrogen are allowed to act on one molecule of dinitroanthrarufin disulfo acid the reduction does not proceed so far. The nitro groups are not transformed into amido groups, but into hydroxylamin groups. Thus a new dyestuff is obtained, which is a disulfo acid of paradihydroxylaminanthrarufin of the formula:

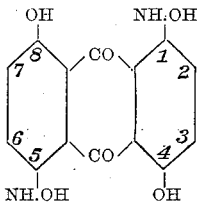

In carrying out my new process practically I can proceed as follows, (the parts are by weight:) Five parts of paradinitroanthrarufin disulfonate of sodium are dissolved in two hundred and fifty parts of water. To the resulting solution a mixture prepared from eight parts of stannous chlorid, thirty parts of water, and thirty liters (in case the parts are kilos, by weight) of concentrated hydrochloric acid is slowly added, with stirring. The reaction mixture, which immediately assumes a blue color, is heated to about from 50° to 60° centigrade. Subsequently it is mixed with a concentrated solution of ammonium chlorid (or another alkaline chlorid) and cooled. Thus the acid ammonium salt of the paradihydroxylaminanthrarufin disulfo acid having the formula:

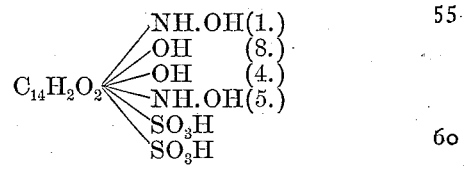

is precipitated in the form of small needle-shaped crystals. Finally this precipitate is filtered, dried, and pulverized. It is a dark powder soluble in water with a blue color, which changes into bluish green on the addition of ammonia. By concentrated sulfuric acid it is dissolved with a yellow color. The coloring-matter dyes unmordanted wool in acid-baths reddish-blue shades and yields on chromium mordants bluish-green shades.

When treated with reducing agents such as stannous chlorid and muriatic acid, the new dyestuff is transformed into the diamidoanthrarufin disulfo acid claimed in the above-mentioned Letters Patent, No. 595,349.

Having now described my invention and in what manner the same is to be performed, what I claim as new, and desire to secure by Letters Patent, is—

1. The process of producing a new anthraquinone dyestuff, being an acid salt of paradihydroxylamin anthrarufin, having the formula

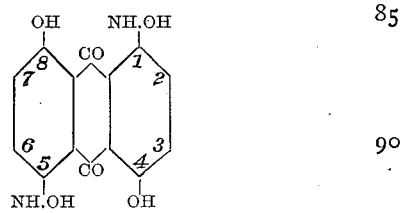

which process consists in reducing one molecule of dinitro anthrarufindisulfo acid with such quantities of reducing agents as correspond to eight atoms of hydrogen, thereby transforming the nitro groups into hydroxylamin groups, for which purpose stannous chlorid with muriatic acid may be employed, substantially as described.

2. As a new article of manufacture the new anthraquinone dyestuff being an acid salt of the acid having the formula

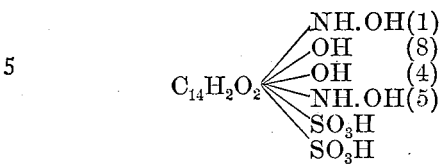

representing in the shape of the acid ammonium salt a dark powder soluble in water with a blue color which changes into bluish green on the addition of ammonia, being dissolved by concentrated sulfuric acid with a yellow color, dyeing wool in acid-baths reddish-blue shades, and yielding on chromium mordants bluish-green shades, being transformed into diamidoanthrarufin disulfo acid when treated with agents of reduction, for which purpose stannous chlorid and muriatic acid may be used, substantially as described.

In testimony whereof I have signed my name in the presence of two subscribing witnesses.

ROBERT E. SCHMIDT.

Witnesses:
R. E. JAHN,
OTTO KÖNIG.